United States Patent
Lim et al.

(10) Patent No.: US 9,516,313 B2
(45) Date of Patent: Dec. 6, 2016

(54) APPARATUS AND METHOD FOR CODING AND DECODING IMAGE

(71) Applicant: SK TELECOM CO., LTD., Seoul (KR)

(72) Inventors: Jeongyeon Lim, Seongnam-si (KR); Joong Gunn Park, Suwon Si (KR); Jongki Han, Seoul (KR); Yunglyul Lee, Seoul (KR); Joohee Moon, Seoul (KR); Haekwang Kim, Seoul (KR); Byeungwoo Jeon, Seongnam-si (KR); Chanwon Seo, Seoul (KR)

(73) Assignee: SK TELECOM COM., LTD., Seoul (KR)

( * ) Notice: Subject to any disclaimer, the term of this patent is extended or adjusted under 35 U.S.C. 154(b) by 322 days.

(21) Appl. No.: 14/143,620

(22) Filed: Dec. 30, 2013

(65) Prior Publication Data

US 2014/0112392 A1    Apr. 24, 2014

Related U.S. Application Data

(63) Continuation of application No. PCT/KR2012/005078, filed on Jun. 27, 2012.

(30) Foreign Application Priority Data

Jul. 1, 2011    (KR) .......................... 10-2011-0065407

(51) Int. Cl.
*H04N 19/51* (2014.01)
*H04N 19/105* (2014.01)
(Continued)

(52) U.S. Cl.
CPC ...... *H04N 19/00696* (2013.01); *H04N 19/105* (2014.11); *H04N 19/117* (2014.11); *H04N 19/139* (2014.11); *H04N 19/176* (2014.11)

(58) Field of Classification Search
None
See application file for complete search history.

(56) References Cited

U.S. PATENT DOCUMENTS

| 5,598,215 A  * | 1/1997 | Watanabe ................. G06T 9/20 348/416.1 |
| 8,284,837 B2 * | 10/2012 | Yin ...................... H04N 19/105 375/240.12 |

(Continued)

FOREIGN PATENT DOCUMENTS

| CN | 101536031 A | 9/2009 |
| KR | 10-2007-0051334 A | 5/2007 |

(Continued)

OTHER PUBLICATIONS

Aoki, Hirofumi, and Yoshihiro Miyamoto. "An H. 264 weighted prediction parameter estimation method for fade effects in video scenes." Image Processing, 2008. ICIP 2008. 15th IEEE International Conference on. IEEE, 2008.*

(Continued)

*Primary Examiner* — Tracy Y Li
*Assistant Examiner* — Mohammad J Rahman
(74) *Attorney, Agent, or Firm* — Hauptman Ham, LLP

(57) ABSTRACT

A video encoding apparatus includes: a parameter calculator to calculate a brightness compensation parameter based on one or more first pixels adjacent to a current block and one or more second pixels adjacent to a motion prediction block obtained by using a prediction motion vector, the one or more second pixels being located in locations corresponding to the one or more first pixels; a target pixel selector to select one or more target pixels for a brightness compensation from pixels in a prediction block determined by a motion vector of the current block, by using pixels adjacent to the motion prediction block; and a predictive encoder to generate a compensated prediction block of the prediction block by applying the brightness compensation parameter to the selected one or more target pixels and to perform a predictive encoding on the generated compensated prediction block.

18 Claims, 10 Drawing Sheets

(51) Int. Cl.
*H04N 19/139* (2014.01)
*H04N 19/176* (2014.01)
*H04N 19/117* (2014.01)

(56) References Cited

U.S. PATENT DOCUMENTS

| | | | | |
|---|---|---|---|---|
| 8,406,569 | B2* | 3/2013 | Segall | G06T 5/50 |
| | | | | 382/254 |
| 2006/0245498 | A1* | 11/2006 | Lee | H04N 19/00696 |
| | | | | 375/240.16 |
| 2008/0253456 | A1* | 10/2008 | Yin | H04N 19/105 |
| | | | | 375/240.16 |
| 2009/0034854 | A1* | 2/2009 | Lee | H04N 19/105 |
| | | | | 382/236 |
| 2010/0183071 | A1* | 7/2010 | Segall | G06T 5/50 |
| | | | | 375/240.16 |
| 2011/0007800 | A1* | 1/2011 | Zheng | H04N 7/34 |
| | | | | 375/240.12 |
| 2011/0235708 | A1* | 9/2011 | Kim | H04N 19/105 |
| | | | | 375/240.12 |
| 2012/0207214 | A1* | 8/2012 | Zhou | H04N 19/105 |
| | | | | 375/240.12 |

FOREIGN PATENT DOCUMENTS

| | | |
|---|---|---|
| KR | 10-2008-0101897 A | 11/2008 |
| WO | 2009084340 A1 | 7/2009 |

OTHER PUBLICATIONS

Jeong-Hoon, Seo et al., Improved Motion Compensation Using Adjacent Pixels, Journal of broadcast engineering, p. 280-289, vol. 15 No. 2, Mar. 31, 2010.
International Search Report mailed Jan. 3, 2013 for PCT/KR2012/005078.
Korean Office Action dated Jan. 10, 2014.

\* cited by examiner $M^*$ : Selected pixels for IC

APPARATUS AND METHOD FOR CODING AND DECODING IMAGE

CROSS-REFERENCE TO RELATED APPLICATION

The instant application is a continuation of PCT/KR2012/005078, filed Jun. 27, 2012, which is based on and claims priority to Korean Patent Application No. 10-2011-0065407, filed on Jul. 1, 2011. The disclosures of above-listed applications are hereby incorporated by reference herein in their entirety.

TECHNICAL FIELD

The present disclosure in some embodiments relates to a method and an apparatus for encoding/decoding a video by applying the luminance compensation technique.

BACKGROUND

The statements in this section merely provide background information related to the present disclosure and do not constitute prior art.

H.264/AVC is the latest video encoding and decoding standard with a utmost compression ratio among the video codecs that have been standardized to date. H.264/AVC seeks to increase the compression efficiency by using intra prediction modes considering directionality, 4×4 integer transform, various block modes from 16×16 to 4×4, a deblocking filter, etc.

H.264/AVC uses a weighted prediction (WP) technology to maximize the coding efficiency for images with changing brightness. WP is the technology for applying a weighting factor and offset in units of slices. The method of its application is expressed by Equation 1.

$$P_{idx}^d = w_{idx}^d \times R_{idx}^d + o_{idx}^d \quad \text{Equation 1}$$

In Equation 1, P is the resulting video from applying WP to reference image R. 'w' and 'o' represent the weighting factor and offset, respectively. Subscripts 'd' and 'idx' respectively denote the predicted direction and reference index. A new reference image P made in this way is used to predict the current image. In addition, 'w's and 'o's that were used for every reference image R are encoded onto a slice header and transmitted to a decoder which then uses reference image R to generate reference image P after applying WP.

The inventor(s) has noted that known WP technologies for application in units of slices are designed to work with fade-in or fadeout effect of images and they cannot take into account factors such as local luminance variations from an illumination and changes in luminance due to motions of an object. Further, the inventor(s) has experienced that the coding efficiency is deteriorated when applying WP to the majority of images without noticeable brightness changes.

SUMMARY

In accordance with some embodiments, a video encoding apparatus comprises a parameter calculator, a target pixel selector and a predictive encoder. The parameter calculator is configured to calculate a brightness compensation parameter based on one or more first pixels adjacent to a current block and one or more second pixels adjacent to a motion prediction block obtained by using a prediction motion vector, wherein the one or more second pixels are located in locations corresponding to the one or more first pixels. The target pixel selector is configured to select one or more target pixels for a brightness compensation from pixels in a prediction block determined by a motion vector of the current block, by using pixels adjacent to the motion prediction block. And the predictive encoder is configured to generate a compensated prediction block of the prediction block by applying the brightness compensation parameter to the selected one or more target pixels and to perform a predictive encoding on the generated compensated prediction block.

In accordance with some embodiments, a video decoding apparatus comprises a parameter calculator, a target pixel selector and a predictive decoder. The parameter calculator is configured to calculate a brightness compensation parameter based on one or more first pixels adjacent to a current block and one or more second pixels adjacent to a motion prediction block obtained by using a prediction motion vector, wherein the one or more second pixels are located in locations corresponding to the one or more first pixels. The target pixel selector is configured to select one or more target pixels for a brightness compensation from pixels in a prediction block determined by a motion vector of the current block, by using one or more pixels adjacent to the motion prediction block. And the predictive decoder is configured to generate a compensated prediction block of the prediction block by applying the brightness compensation parameter to the selected one or more target pixels and to perform a predictive decoding on the generated compensated prediction block.

In accordance with some embodiments, a video encoding apparatus is configured: to calculate a brightness compensation parameter based on one or more first pixels adjacent to a current block and one or more second pixels adjacent to a motion prediction block obtained by using a prediction motion vector, wherein the one or more second pixels are located in locations corresponding to the one or more first pixels; to select one or more target pixels for a brightness compensation from pixels in a prediction block determined by a motion vector of the current block, by using one or more pixels adjacent to the motion prediction block; and to generate a compensated prediction block of the prediction block by applying the brightness compensation parameter to the selected one or more target pixels and then performing a predictive encoding on the generated compensated prediction block.

In accordance with some embodiments, a video decoding apparatus is configured: to calculate a brightness compensation parameter based on one or more first pixels adjacent to a current block and one or more second pixels adjacent to a motion prediction block obtained by using a prediction motion vector, wherein the one or more second pixels are located in locations corresponding to the one or more first pixels; to select one or more target pixels for a brightness compensation from pixels in a prediction block determined by a motion vector of the current block, by using one or more pixels adjacent to the motion prediction block; and to generate a compensated prediction block of the prediction block by applying the brightness compensation parameter to the selected one or more target pixels and then performing a predictive decoding on the generated compensated prediction block.

DETAILED DESCRIPTION

Figure 1:
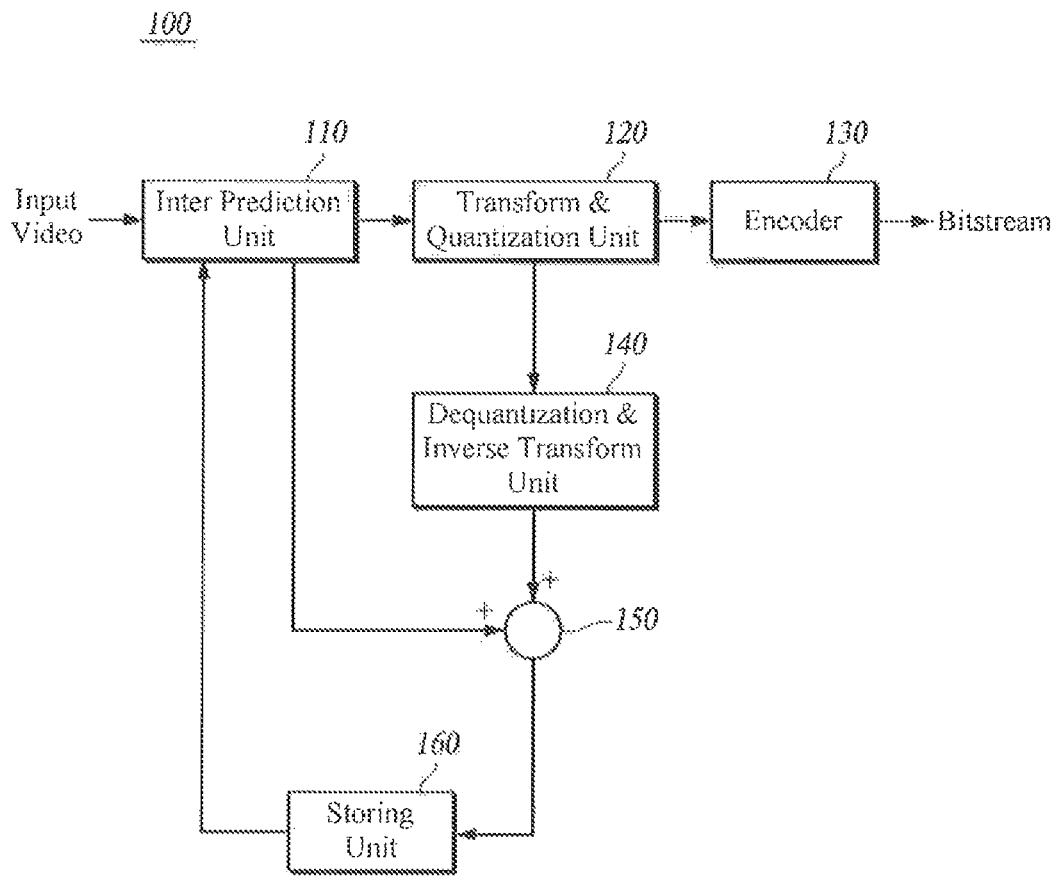
FIG. 1 is a diagram of a configuration of a video encoding apparatus according to at least one embodiment of the present disclosure.

At least one of the aspects of the present disclosure selectively applies the luminance compensation technology to pixels in the current block subject to encoding. Another aspect of the present disclosure provides an encoding and decoding method for adaptively performing a block-wise luminance compensation and further performing a pixel-wise luminance compensation in a block according to different circumstances with luminance variations.

Hereinafter, at least one embodiment of the present disclosure will be described in detail with reference to the exemplifying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

FIG. 1 is a diagram of a configuration of a video encoding apparatus according to at least one embodiment of the present disclosure.

The video encoding apparatus 100 includes an inter prediction unit 110, a transform and quantization unit 120, an encoder 130, an inverse quantization and an inverse transform unit 140, an adder 150 and a storage unit 160. All or some components of the video encoding apparatus 100, such as the transform and quantization unit 120, the encoder 130, the inverse quantization and the inverse transform unit 140, and an adder 150 are implemented by one or more processors and/or application-specific integrated circuits (ASICs).

The video encoding apparatus is a user terminal such as a PC (personal computer), notebook computer, PDA (personal digital assistant), PMP (portable multimedia player), PSP (PlayStation Portable), mobile communication terminal among other user terminals. The video encoding apparatus means various apparatuses each including (a) a communication apparatus such as a communication modem and the like for performing communication with various types of devices or wired/wireless communication networks, (b) a memory for storing various programs and data that perform video coding, and (c) a microprocessor to execute a program so as to perform calculations and controlling, and the likes.

The image to be encoded is input in units of blocks such as macroblocks. For the purpose of description, at least one embodiment of the present disclosure defines the macroblock in the 16×16 form in the same manner as the H.264/AVC standard, although the macroblock is more generally shaped by M×N where M and N are respectively greater than 16 and be the same or different integers.

Inter prediction unit 110 determines a search range in a previous frame reconstructed after already undergoing an encoding process, and it performs a motion estimation process in the determined search range to generate a prediction block having a high correlation with the current block and thus incurring the smallest possible error with respect to the current block. In addition, the inter prediction unit 110 uses the current block and the prediction block to generate and transmit a residual block to the transform and quantization unit 120. In addition, the motion estimation process generates and provides a current block's motion vector to encoder 130. Besides, the inter prediction unit 110 carrys out an inter prediction by applying the luminance compensation technology according to at least one embodiment of the present disclosure, which will be described hereinafter with reference to FIG. 2.

Transform and quantization unit 120 transforms the residual block output from inter prediction unit 110 into the frequency domain and then quantizes the frequency-domain residual block. To be more specific, transform and quantization unit 120 performs transform to frequency domain from a residual coefficient of the residual block generated by inter prediction unit 110 and thereby generates and quantizes a residual block having a frequency coefficient. Here, the transform method used is a spatial-to-frequency domain transform of an image signal such as Hadamard transform, a discrete cosine transform (DCT) based integer transform, and the likes. The quantization method uses various quantization techniques such as a dead zone uniform threshold quantization (DZUTQ) or a quantization weighted matrix. However, the transform and quantization methods mentioned are not to limit the present disclosure from employing other various transform and quantization techniques.

Encoder 130 encodes the transformed and quantized residual block from the transform and quantization unit 120 to generate encoded data. The generated encoded data is outputted into a bitstream. The encoding method of encoder 130 is not limited to but includes entropy encoding and other various encoding schemes are utilized.

In addition, encoder 130 makes the encoded data include various information for decoding the encoded data. For example, the encoded data includes a coded block pattern (CBP), a delta quantization parameter, prediction information used for a prediction such as motion vectors or the prediction motion vector index information used for predicting the motion vectors, and the likes.

The inverse quantization and inverse transform unit 140 reconstructs the residual block by inverse quantizing and inverse transforming the residual block converted and quantized by the transform and quantization unit 120. That is, the transform process and the quantization process performed by the transform and quantization unit 120 are inversely performed, they are realized in various method. For example, the inverse quantization and inverse transform unit 140 uses the same pre-shared processes of the transform and the inverse transform or the quantization and the inverse quantization. Alternatively, the inverse quantization and inverse transform unit 140 performs the transform and quantization by inversely performing the transform and quantization processes of the transform and quantization unit 120 by using relevant information to the transform and quantization processes, for example, information on a transform size, transform shape and quantization type generated and transmitted by the transform and quantization processes.

The adder 150 generates the reconstruction block by adding the residual block reconstructed from the inverse quantization and inverse transform unit 140 and the prediction block outputted from the inter-prediction unit 110. The generated reconstruction block is stored in the storage unit 160 and it is used as a reference frame to encode a target block to be encoded later.

Meanwhile, though not shown in FIG. 1, the video encoding apparatus according to at least one embodiment of the present disclosure further includes an intra-prediction unit besides the inter-prediction unit 120. The intra-prediction unit generates the prediction block for the current block by using the reference pixel values available in the neighboring blocks spatially placed around the current block. In this case, an error value between the current block and the prediction block is calculated for each available intra-prediction mode and the prediction block is generated by applying the intra-prediction mode having the minimum error value. In addition, the information for the intra-prediction mode is supplied to the encoder 130 by encoding the intra-prediction mode having the minimum error value. Further, the residual block generated by using the current block and the intra-predicted prediction block is transmitted to the transform and quantization unit 120.

In addition, the video encoding apparatus according to at least one embodiment of the present disclosure further includes a deblocking filter for filtering the reconstruction block to reduce a blocking artifact generated by the prediction and quantization in units of blocks. At this time, the intra-prediction uses the reconstruction block before filtering by the deblocking filter, and the inter-prediction uses a filtered reconstruction block.

Meanwhile, the video encoding apparatus according to at least one embodiment of the present disclosure determines the mode of prediction prior to generating and predictively encoding the prediction block. The prediction mode includes an inter mode, an intra mode, a skip mode and a merge mode among others.

For example, in the skip mode, the encoding apparatus transmits a flag for indicating the skip mode used in encoding the current block to the decoding apparatus, whereas the decoding apparatus is responsive to the received flag indicating the skip mode for predicting the motion vector of the current vector by using the motion vector of the neighboring blocks of the current vector and performing the motion compensation. In addition, the skip mode arranges the index information of the motion vector to be further transmitted to the decoding apparatus.

In the merge mode, when the encoding apparatus transmits to the decoding apparatus, information on which motion vector is used to encode the current block (for example, whether the motion vector of a block next to the left side of the current block is used or the motion vector of a block next to the top of the current block is used), the decoding apparatus performs the predictive decoding on the current block by using the motion vector indicated by the received information. On the other hand, the merge mode sometimes arranges encoded data of the residual block to be transmitted to the decoding apparatus.

Figure 2:
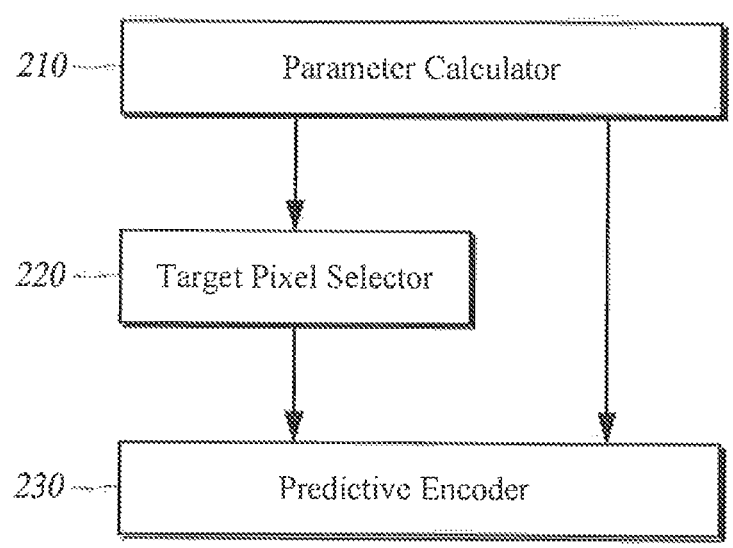
FIG. 2 is a diagram of a configuration of an inter prediction unit of a video encoding apparatus according to at least one embodiment of the present disclosure.

FIG. 2 is a diagram of a configuration of an inter prediction unit of a video encoding apparatus according to at least one embodiment of the present disclosure.

The inter prediction unit 110 includes a parameter calculator 210, a target pixel selector 220 and a predictive encoder 230. All or some components of the inter prediction unit 110, such as the parameter calculator 210, the target pixel selector 220 and the predictive encoder 230 are implemented by one or more processors and/or application-specific integrated circuits (ASICs).

The parameter calculator 210 calculates a brightness compensation parameter based on one or more first pixel neighboring (or adjacent to) a current block and second pixels residing in corresponding locations to the first pixels and neighboring (or adjacent to) a motion prediction block obtained by using a prediction motion vector.

Figure 3:
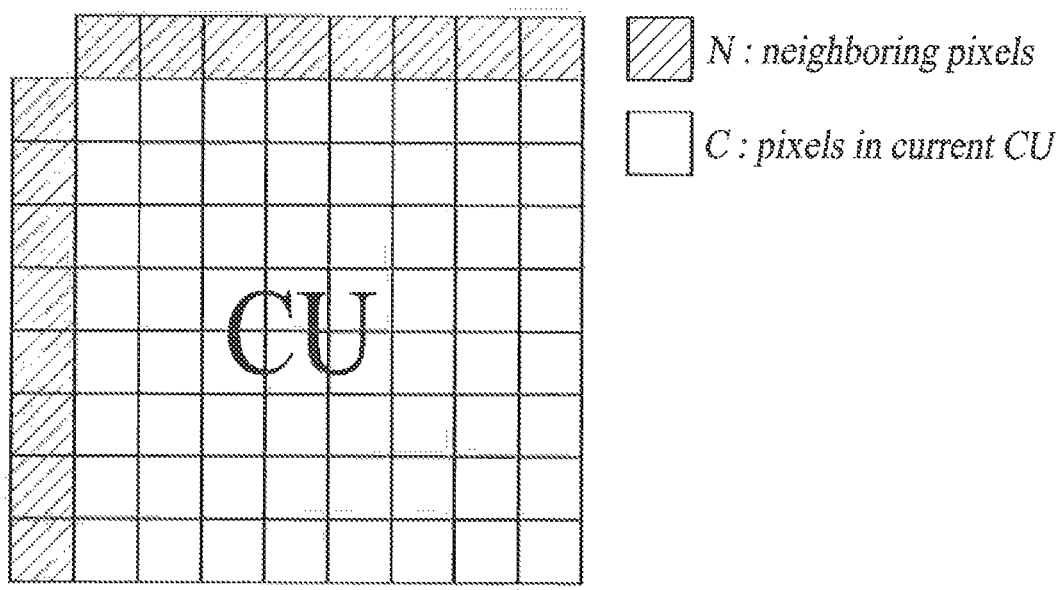
FIGS. 3 to 6 are exemplary diagrams of an encoding method by applying a luminance compensation according to at least one embodiment of the present disclosure, where CU represents coding unit and MC is motion compensation.

As shown in FIG. 3, the first pixels are determined by using the neighboring pixels of the current block (CU). For example, the first pixels are determined based on a maximum threshold and a minimum threshold both calculated from values of neighboring pixels of the current block, wherein the maximum threshold and the minimum threshold is calculated by Equation 2 as follows:

$$T^N_{min} = m_N - \Delta_N$$
$$T^N_{max} = m_N + \Delta_N$$
$$\Delta_N = \frac{2}{S_N} \sum_{i=1}^{S_N} |N(i) - m_N|$$

Equation 2 wherein $T^N_{min}$ is the minimum threshold, $T^N_{max}$ is the maximum threshold, $S_N$ is the total number of the neighboring pixels of the current block, and N(i) represents the respective pixel values of neighboring pixels of the current block.

When the maximum threshold and the minimum threshold are determined, the first pixels are determined by Equation 3 as follows:

$$N^* = \{N(i) | T^N_{min} \le N(i) \le T^N_{max}\}$$

Equation 3 wherein N° represents the set of the first pixels.

Figure 4:
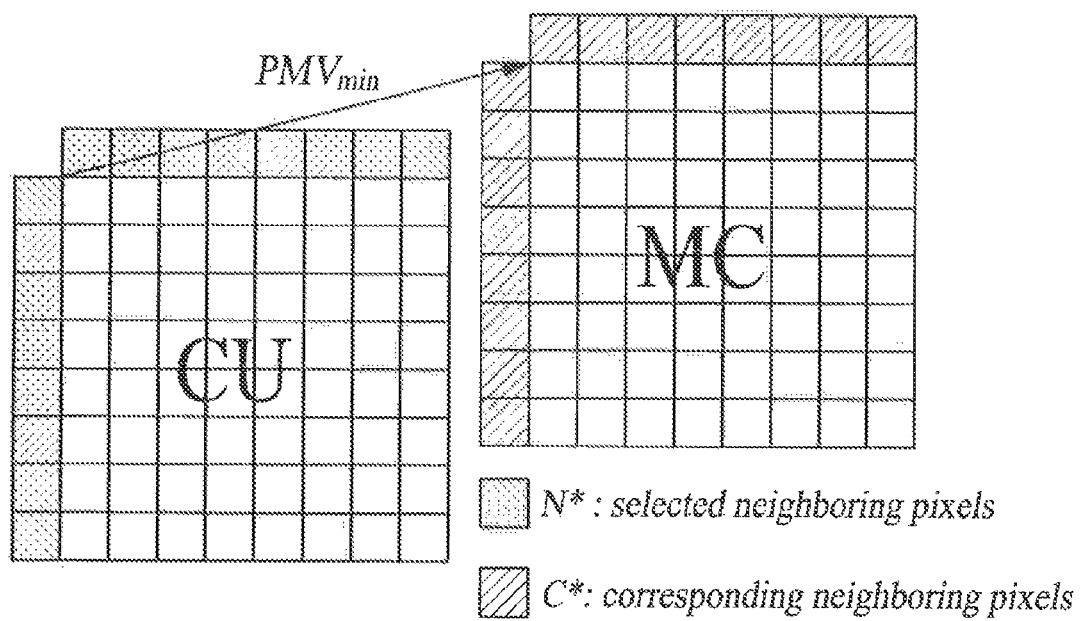

On the other hand, if the first pixels are determined, the second pixels are determined as the pixels in corresponding positions to the first pixels among the pixels neighboring the motion prediction block (MC) obtained by using a predictive motion vector (PMV), as shown in FIG. 4. In the present disclosure, the 'motion prediction block' means such prediction block as obtained by using a prediction motion vector. On the other hand, the current block's 'motion prediction block' determined by the motion estimation process is so termed to distinguish it from a 'prediction block' which defines an actual prediction block obtained by using an actual motion vector.

The predictive motion vector used for determining the second pixels is selected from predictive motion vector candidates. For example, the predictive encoding is tried on the respective prediction motion vector candidates by applying a brightness compensation parameter as explained below, and the most efficient prediction motion vector candidates in encoding the current block are used as one for determining the second pixels. Alternatively, a specific one of the prediction motion vector candidates are used as the prediction motion vector for determining the second pixels, and it is pre-arranged between the encoding apparatus and the decoding apparatus. In this way, the encoding apparatus needs not transmit information the identification of the used prediction motion vector candidate to the decoding apparatus, further increasing the encoding efficiency.

In addition, to determine the second pixels, the prediction motion vector is used in various pixel units such as an integer pixel unit, ½ pixel unit, ¼ pixel unit or the like. However, when utilizing the prediction motion vector in units of ½ pixels, ¼ pixels or the like, the complexity is increased due to the necessitated interpolation filter. Accordingly, although the present disclosure takes the prediction motion vector in integer pixel unit, the scope of the present disclosure is not limited thereto.

If the first pixels and the second pixels are determined, the brightness compensation parameter is calculated based on the first pixels and the second pixels and includes at least one of a weighting factor and an offset. Herein, the weighting factor is calculated based on a ratio of pixel values between the first pixels and the second pixels and the offset is calculated based on differences of the pixel values between the first pixels and the second pixels. For example, the weighting factor and the offset can be calculated by Equation 4 as follows:

$$w = \sum_{i=1}^{S_{N^*}} N^*(i) \Big/ \sum_{i=1}^{S_{N^*}} C^*(i)$$

$$o = \frac{\sum_{i=1}^{S_{N^*}} N^*(i) - \sum_{i=1}^{S_{N^*}} C^*(i)}{S_{N^*}}$$

Equation 4

In equation 4, w is the weighting factor, o is the offset, $S_{N^*}$ is the number of the first pixels, $N^*(i)$ is the respective pixel values of the first pixels, $C^*(i)$ is the respective pixel values of the second pixels.

The target pixel selector 220 selects the target pixels to apply the brightness compensation parameter among the pixels in the prediction block determined by the motion vectors for the current block by using the pixel values of the neighboring pixels adjacent to the motion predictive blocks obtained by using the prediction motion vector. That is, the target pixel selector 220 selects the target pixels to apply the brightness compensation parameter among the pixels belonging to the prediction block for the current block obtained by using the practical motion vector for the current block obtained by the motion estimation process by using the pixel values of the neighboring pixels adjacent to the motion predictive blocks obtained by using the prediction motion vector.

For example, the target pixel selector 220 selects the target pixels based on a minimum threshold (e.g., a minimum threshold is set up to be a predetermined value) and a maximum threshold (e.g., a minimum threshold is predetermined is set up to be a predetermined value) both calculated from the pixel values of neighboring pixels adjacent to the motion prediction blocks obtained by using the prediction motion vector. Herein, the maximum threshold and the minimum threshold are calculated by Equation 5 as follows:

$$T_{min}^C = m_C - \Delta_C$$

$$T_{max}^C = m_C + \Delta_C$$

$$\Delta_C = \frac{2}{S_C} \sum_{i=1}^{S_C} |C(i) - m_C|$$

Equation 5

In equation 5, wherein subscript C is a set of the neighboring pixels of the motion prediction blocks, $T^N_{min}$ is the minimum threshold, $T^N_{max}$ is the maximum threshold, $m_c$ is an average of the pixel values of the neighboring pixels belonging to the set C, Sc is the number of elements in the set C, and C(i) represents the respective pixel values of the neighboring pixels belonging to the set C.

When the minimum threshold and the maximum threshold are determined, as shown in Equation 6, the target pixel selector 220 selects the pixels having pixel values above the minimum threshold and below the maximum threshold in the prediction blocks obtained by using the motion vectors for the current blocks as the target pixels.

$$M^* = \{M(j) | T_{min}^C \leq M(j) \leq T_{max}^C\}$$

Equation 6

In Equation 6, M(j) represents the respective pixel values in the prediction blocks obtained by using the motion vector for the current block and M* is a set of the target pixels.

The predictive encoder 230 generates the compensated prediction block for the prediction blocks determined by the motion vectors for the current block by applying the brightness compensation parameter calculated by the parameter calculator 210 for the target pixels selected from the target pixel selector 220 and performs the predictive encoding by using the generated compensated prediction blocks. That is, the predictive encoder 230 generates the residual blocks by using the current block and the compensated prediction blocks and transmits the generated residual blocks to the transform and quantization unit 120.

When the denominator of the weighting factor w is not zero in equation 5, the weighting factor w is used as a brightness compensation parameter to be applied to the target pixel; and when the denominator of the weighting factor w is zero, the offset o is used as the brightness compensation parameter to be applied to the target pixel. These are represented by the following equation 7.

$$P(j) = \begin{cases} w \times M(j) & \text{if } M(j) \in M^* \ \& \ A_{C^*} \neq 0 \\ M(j) + o & \text{if } M(j) \in M^* \ \& \ A_{C^*} = 0 \\ M(j) & \text{otherwise} \end{cases}$$

Equation 7 wherein $$A_{C^*} = \sum_{i=1}^{S_{N^*}} C^*(i)$$

Figure 5:
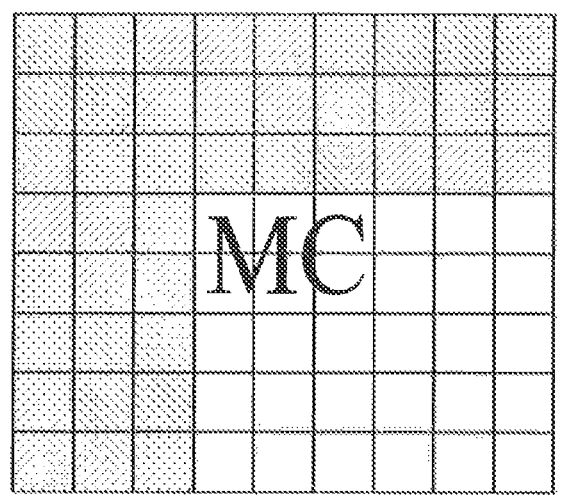
Figure 5:

FIG. 5 shows an example to select the target pixel for applying the brightness compensation parameter among the prediction blocks through the method described above.

On the other hand, when the brightness compensation parameter deviates from a predetermined normative range, e.g., when the weighting factor deviates from a reference range with reference to 1, the predictive encoder 230 applies the brightness compensation parameter to all pixels in the prediction blocks obtained by using the motion vectors for the current block without the target pixels selected by the target pixel selector 220.

Meanwhile, the predictive encoder 230 encodes a flag for indicating whether the predictive encoding was performed by applying a brightness compensation to the target pixels selected by the target pixel selector 220, or allows the flag to be encoded by transmitting it to the encoder 130. When the predictive encoder 230 transmits the flag included in encoded data, the decoding apparatus received the encoded data and extracts the flag from the received the encoded data. The decoding apparatus performs the decoding by applying the brightness compensation technology described above when a value of the flag included in the encode data is identified.

On the other hand, in order to increase the encoding efficiency for the motion vectors, the video encoding apparatus encodes the difference between the motion vector for the current block and the prediction motion vector, i.e., the motion vector difference, and transmit the motion vector difference thereof and the index information of the used prediction motion vector to the video decoding apparatus. Herein, the prediction motion vector used for determining the second pixels is used as the prediction motion vectors used for calculating the motion vector difference. Particularly, when the prediction motion vector used for determining the second pixels are pre-arranged between the encoding apparatus and the decoding apparatus, the encoding apparatus does not transmit the index information on the prediction motion vector to the decoding apparatus.

Hereinabove, there is described the video encoding method applying the brightness compensation technology in a unidirectional prediction using one motion predictive block. However, the present disclosure is not limited to this, but it is applied to the brightness compensation technology proposed in the embodiments of the present disclosure although the encoding is performed by using at least one motion predictive blocks. For example, as shown in FIG. 6, even in the bi-directional prediction using two motion predictive blocks, the brightness compensation technology proposed by the embodiments of the present disclosure is applied.

Figure 6:
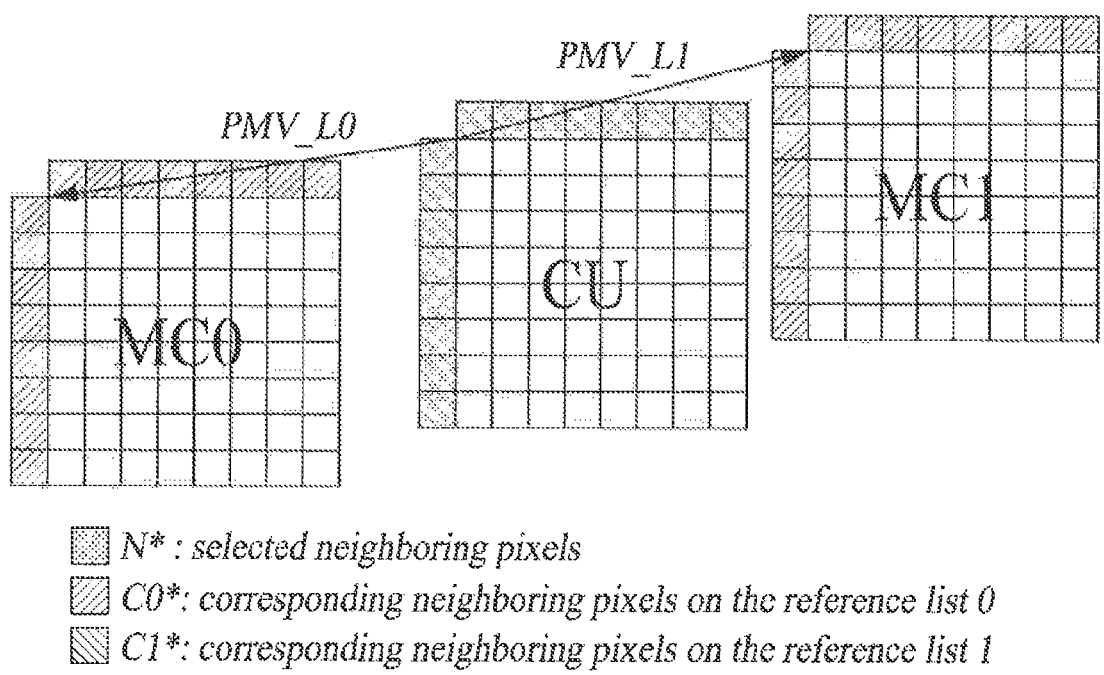

In case of the bi-directional prediction, as shown in FIG. 6, two motion prediction blocks obtained by using two prediction motion vectors are used, the pixels neighboring to one of the motion predictive block between two motion predictive blocks and placed at the position corresponding the first pixels and the pixels neighboring to the other motion predictive block and placed at the position corresponding the first pixels and the other motion predictive block are used as the second pixels.

In this case, the brightness compensation parameter is calculated by Equation 8 as follows:

$$w = \sum_{i=1}^{S_{N^*}} N^*(i) \bigg/ \sum_{i=1}^{S_{N^*}} C_{avg}^*(i)$$

$$o = \frac{\sum_{i=1}^{S_{N^*}} N^*(i) - \sum_{i=1}^{S_{N^*}} C_{avg}^*(i)}{S_{N^*}}$$

$$C_{avg}^*(i) = \frac{C0^*(i) + C1^*(i) + 1}{2}$$

Equation 8

In equation 8, C0*(i) is the respective pixel values of the second pixels belonging to one of the two motion prediction blocks, and C1*(i) represents the respective pixel values of the second pixels belonging to the other of the two motion prediction blocks.

Meanwhile, the target pixels to apply the brightness compensation parameter is determined by applying the equations 5 and 6 to two prediction blocks, respectively, for the current block, and the compensated prediction block is generated by applying the brightness compensation parameter determined by the method of the equation 8 for the determined target pixels.

Meanwhile, the video encoding apparatus according to the embodiments of the present disclosure inserts a value of a flag included in a slice header of encoded data to indicate a performance or nonperformance of a full block brightness compensation. When the value of the flag included in the slice header indicates the performance of the full block brightness compensation, the predictive encoder 230 applies the brightness compensation parameter calculated by the parameter calculator 210 to all pixels belonging to the prediction blocks without the target pixels selected by the target pixel selector 220. That is, the brightness compensation technology is applied to all pixels belong to the blocks according to the flag inserted in the slice header, or the brightness compensation technology is applied to the limited target pixels selected by the target pixel selector 220.

On the other hand, in the above, although the brightness compensation technology proposed in the embodiments of the present disclosure are described only for the inter-mode, the scope of the present disclosure is not limited to this, and the brightness compensation technology proposed in the embodiments of the present disclosure is applied to the skip or the merge mode, e.g., in case of the skip mode or the merge mode, the encoding or the decoding is performed by applying the brightness compensation parameter calculated by the parameter calculator 210 for all pixels belonging to the prediction blocks.

Figure 7:
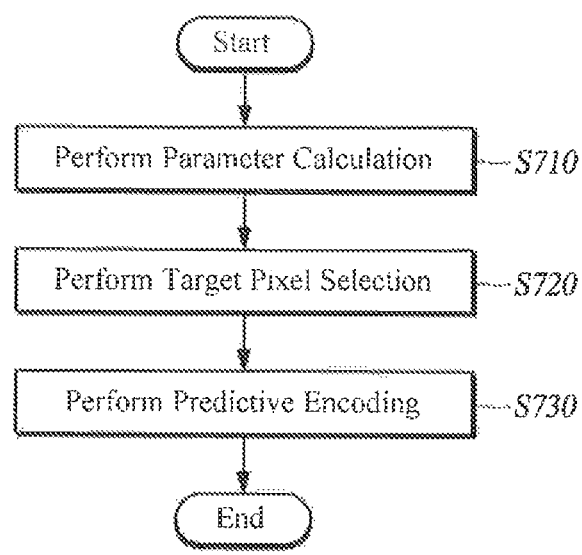
FIG. 7 is a flowchart of a video encoding method according to at least one embodiment of the present disclosure.

FIG. 7 is a flowchart of a video encoding method according to at least one embodiment of the present disclosure.

As shown in FIG. 7, the video encoding method according to at least one embodiment of the present disclosure includes a parameter calculation step S710, a target pixel selection step S720 and a predictive encoding step S730.

In the parameter calculation step S710, the brightness compensation parameter is calculated based on at least one of the first pixels neighboring to the current block and the second pixels neighboring to at least one motion predictive block obtained by using the prediction motion vector and placing at the position corresponding the first pixels.

In the target pixel selection step S720, the target pixels for performing the brightness compensation are selected among the pixels in at least one prediction block obtained by the motion vector for the current block using the neighboring pixels adjacent to at least one motion predictive block.

In the predictive encoding step S730, the compensated prediction block for at least one prediction block by applying the brightness compensation parameter calculated in the parameter calculation step S710 to the target pixel selected in the target pixel selection step S720, and the prediction encoding is performed by using the generated compensated prediction blocks. That is, the encoding is performed by generating the residual blocks using the current block and the compensated prediction blocks.

Since each of the parameter calculation step S710, the target pixel selection step S720 and the predictive encoding step S730 correspond to the processes performed by the parameter calculator 210, the target pixel selector 220 and the predictive encoder 230 with reference to FIG. 2, further detailed description will be omitted, and all contents described above with reference to FIG. 2 are applied to the video encoding method as it is.

Meanwhile, the video encoding method described above is implemented in a computer program and stored on the recording medium, and it is implemented by making the computer access to the recording medium and run the program. It is not limited to this, but the video encoding method is realized by implementing the modules to perform each step of the video encoding method with one hardware chip and driving the hardware chip.

Figure 8:
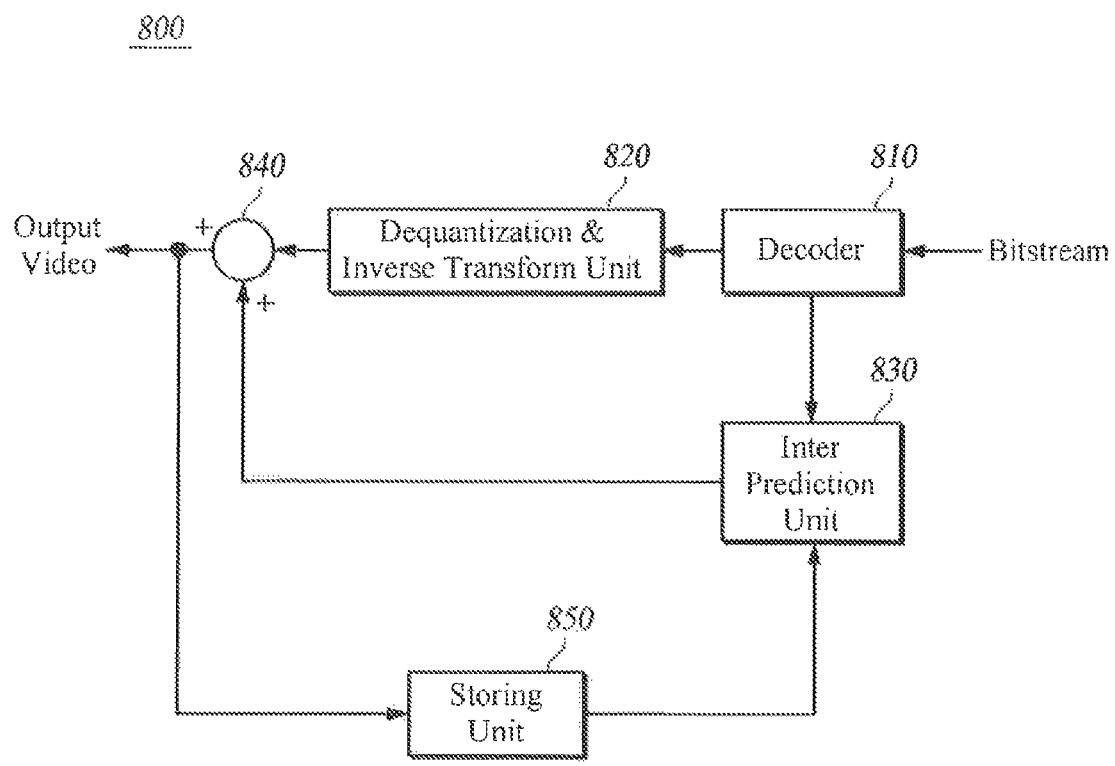
FIG. 8 is a diagram of a configuration of a video decoding apparatus according to at least one embodiment of the present disclosure.

FIG. 8 a diagram of a configuration of a video decoding apparatus according to at least one embodiment of the present disclosure.

The video encoding apparatus according to at least one embodiment of the present disclosure, similar to the video encoding apparatus described above in FIG. 1, is a PC (personal computer), notebook computer, PDA (personal digital assistant), PMP (portable multimedia player), PSP (PlayStation Portable), mobile communication terminal or the like, and mean various apparatuses each including a communication apparatus such as a communication modem and the like for performing communication with various types of devices or wired/wireless communication networks, a memory for storing various programs and data that perform video coding, and a microprocessor to execute a program so as to perform calculations and controlling, and the likes.

The video decoding apparatus 800 according to at least one embodiment of the present disclosure includes a decoder 810, a dequantization & inverse transform unit 820, an inter prediction unit 830, an adder 840 and a storing unit 850. All or some components of the video decoding apparatus 800, such as the decoder 810, the dequantization & inverse transform unit 820, the inter prediction unit 830 and the adder 840 are implemented by one or more processors and/or application-specific integrated circuits (ASICs).

The decoder 810 extracts the information required for the block unit decoding by entropy decoding the received encoded data. In other words, the decoder 810 extracts the quantization frequency coefficient sequence by decoding the data, and generates the residual blocks having the quantization frequency coefficient by inverse scanning the quantization frequency coefficient sequence. For example, when the encoding apparatus uses a zig zag scanning method, the decoding apparatus generates the residual blocks having the quantization frequency coefficient by inverse scanning the quantization frequency coefficient sequence by applying an inverse zig zag scanning method. In addition, the decoder 810 extracts the information required for decoding, for example, such as the information for the prediction mode, the information on the motion vector or the like, from the encoded data. In addition, the information such as the flag, inserted (embedded) in the slice header of encoded data, for indicating whether the brightness compensation will be performed for the entire image, the flag for indicating whether the brightness compensation technology is applied, or the like is extracted from the encoded data received from the video encoding apparatus 100.

The dequantization & inverse transform unit 820 inversely quantizes the quantized residual blocks received from the decoder 810 and generates the residual blocks by inverse transforming them again.

The inter prediction unit 830 generates the prediction blocks from the reference frames stored in the storing unit 850 by using the information for the motion vector and the like required for the inter prediction transmitted from the decoder 810. Meanwhile, the inter prediction unit 830 performs the inter prediction using the brightness compensation proposed by at least one embodiment of the present disclosure, it will be described hereinafter with reference to FIG. 9.

The adder 840 reconstructs the current block by adding the prediction blocks transmitted from the inter prediction unit 830 and the residual blocks transmitted from the dequantization & inverse transform unit 820. The reconstructed current block is stored in the storing unit 850, and it will be used for predicting the following other blocks.

On the other hand, although not shown in FIG. 8, similar to the video encoding apparatus, the video decoding apparatus according to at least one embodiment of the present disclosure includes an intra prediction unit for intra prediction and a deblocking filter for filtering the reconstruction blocks to reduce the blocking effect generated due to the block unit prediction and quantization. In addition, the video decoding apparatus supports the skip mode or the merge mode.

Figure 9:
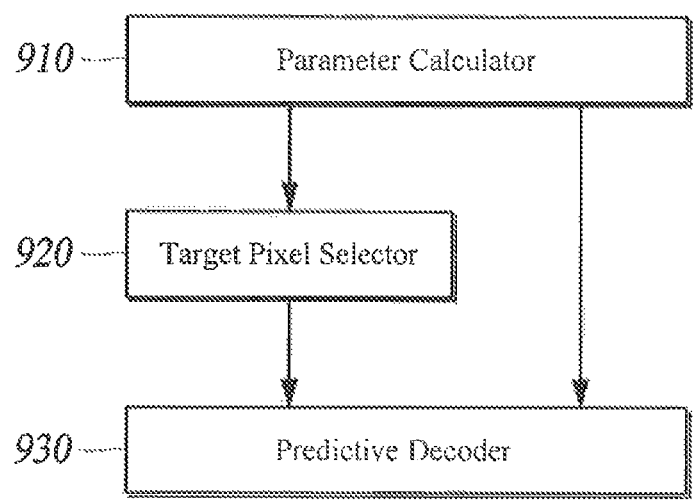
FIG. 9 is a diagram of a configuration of an inter prediction unit of a video decoding apparatus according to at least one embodiment of the present disclosure.

FIG. 9 is a diagram of a configuration of an inter prediction unit of a video decoding apparatus according to at least one embodiment of the present disclosure.

The inter prediction unit 830 according to at least one embodiment of the present disclosure includes a parameter calculator 910, a target pixel selector 920 and a predictive decoder 930. All or some components of the inter prediction unit 830, such as the parameter calculator 910, the target pixel selector 920 and the predictive decoder 930 are implemented by one or more processors and/or application-specific integrated circuits (ASICs).

The parameter calculator 910 calculates the brightness compensation parameter based on at least one first pixel adjacent to the current block and the second pixels adjacent to at least one motion predictive block obtained by using the prediction motion vectors and placed in the position corresponding the first pixels.

Herein, the prediction motion vectors used for determining the second pixels are used by being selected among the prediction motion vector candidates shared with the video encoding apparatus. For example, the prediction motion vector to be used for determining the second pixels among the prediction motion vector candidates by using the index information for the prediction motion vector transmitted from the video encoding apparatus is determined. Or, if the video encoding apparatus prearranges a specific prediction motion vector candidate to use as the prediction motion vector, the prearranged specific prediction motion vector candidate is used as the prediction motion vector for determining the second pixels.

The target pixel selector 920 selects the target pixels to perform the brightness compensation among the pixels in at least one prediction block determined by the motion vector for the current block by using the neighboring pixels adjacent to at least one motion predictive block. That is, the video decoding apparatus determines at least one prediction block by using the motion vector for the current block calculated through the information for the motion vector received from the encoding apparatus, the target pixel selector 920 selects the target pixels to apply the brightness compensation parameter among the pixels belonging to at least one prediction block by using the neighboring pixels adjacent to at least one motion predictive block obtained through the prediction motion vectors.

Since the parameter calculator 910 and the target pixel selector 920 according to at least one embodiment of the present disclosure are elements respectively corresponding the parameter calculator 210 and the target pixel selector 220 of the video encoding apparatus described above and the functions thereof are the same, further detail description thereof will be omitted and all the above descriptions for the parameter calculator 210 and the target pixel selector 220 of the video encoding apparatus are applied.

The predictive decoder 930 performs the prediction decoding for reconstructing the current block by generating the compensated prediction blocks for at least one prediction block determined by the motion vector for the current block by applying the brightness compensation parameter calculated by the parameter calculator 910 to the target pixels selected in the target pixel selector 920. In the predictive decoder 930, the process for generating the compensated prediction blocks by applying the brightness compensation parameter to the target pixels is equal to the predictive decoder 230 of the video encoding apparatus, and further detailed explanation will be omitted.

Meanwhile, in case where the video decoding apparatus receives the flag, which is transmitted by the video encoding apparatus in a encoded data, for indicating whether the brightness compensation technology is applied, the predictive decoder 930 variously applies the brightness compensation technology according to the flag or a value of the flag. That is, the predictive decoder 930 variously applies the brightness compensation technology with reference to the flag (or the value of the flag) decoded from the received encoded data. For example, the predictive decoder 930 applies the brightness compensation parameter to the target pixels with reference to the flag when the received flag is a flag indicating the application of the brightness compensation technology.

In addition, in case where the video decoding apparatus receives the flag, which is transmitted by the video encoding apparatus in a encoded data, for indicating whether the brightness compensation for the entire image is applied by inserting the flag into the slice header, the predictive decoder 930 applies the brightness compensation parameter to all pixels in the prediction blocks without limiting to the target pixels selected in the target pixel selector 920 when the flag included in the slice header (i.e., where the slice header is one of decoded data which is obtained by decoding the received encoded data by the decode 810) indicates the brightness compensation application for the entire image (i.e., when the flag indicates a full block brightness compensation).

In addition, when the brightness compensation parameter calculated by the parameter calculator 910 deviates from a predetermined normative range, the predictive decoder 930 applies the brightness compensation parameter to all pixels in the prediction blocks without limiting to the target pixels selected in the target pixel selector 920.

Hereinbefore, the video decoding method using the brightness compensation technology proposed in at least one embodiment of the present disclosure is explained only for the inter mode. However, the scope of the present disclosure is not limited thereto. For example, the present disclosure is applied to the skip mode or the merge mode, in this case, the brightness compensation parameter is applied to all pixels in the prediction block without limiting to the target pixels selected in the target pixel selector 920. For example, in case of the skip mode, when the flag for indicating the skip mode and the index information for the motion vectors are received from the video encoding apparatus, the parameter calculator 910 predicts the motion predictive blocks by using the prediction motion vectors indicated by the received index information, after selects the second pixels adjacent to the predicted motion predictive blocks and placed at the position corresponding the first pixels, and calculates the brightness compensation parameters based on the first pixels and the second pixels. In addition, the compensated prediction blocks are generated by applying the brightness compensation parameter to all pixels in the prediction blocks obtained by using the motion vector for the current block.

Figure 10:
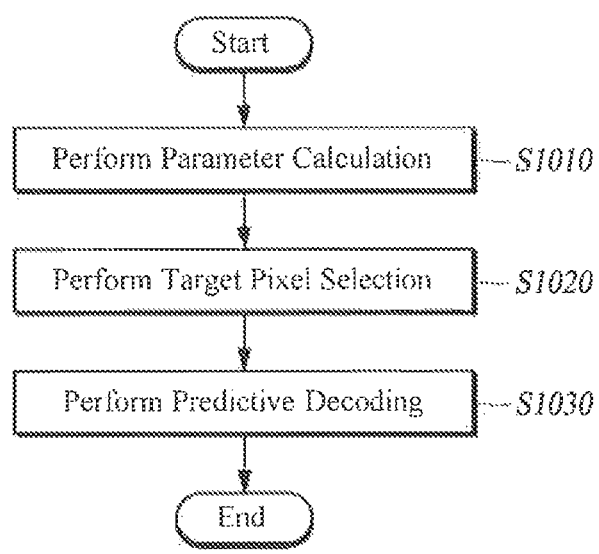
FIG. 10 is a flowchart of a video decoding method according to at least one embodiment of the present disclosure.

FIG. 10 is a flowchart of a video encoding method according to at least one embodiment of the present disclosure.

The video encoding method according to at least one embodiment of the present disclosure includes a parameter calculation step S1010 of calculating a brightness compensation parameter based on at least one first pixel adjacent to a current block and second pixels adjacent at least one motion predictive blocks obtained by using prediction motion vectors and placed at a position corresponding the first pixels, a target pixel selection step S1020 of selecting target pixels to perform a brightness compensation among pixels in at least one predictive block obtained by using the motion vector for the current block by using neighboring pixels adjacent to at least one motion predictive block and a predictive decoding step S1030 of performing a predictive decoding after generating the compensated prediction blocks for at least one prediction block by applying the brightness compensation parameter to the selected target pixels.

Herein, the parameter calculation step S1010, the target pixel selection step S1020 and the predictive decoding step S1030 are the same as the processes performed by the parameter calculator 910, the target pixel selector 920 and the predictive decoder 930 of FIG. 9 described above, respectively, and further detailed explanation will not be repeated.

The video encoding method described above, will be able to be implemented by a computer program and stored in a non-transitory computer readable media for the computer to access and execute. However, the present disclosure is not limited thereto, and the video encoding method is implemented by embodying the respective modules for performing the steps of the video encoding method in a single hardware chip which executes the video encoding method. According to the present disclosure as described above, the present disclosure improves the coding efficiency by selectively applying a luminance compensation technology to the pixels belonging to the current block.

Some embodiments as described above are implemented in the form of one or more program commands that are read and executed by a variety of computer systems and be recorded in any non-transitory, computer-readable recording medium. The non-transitory computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

What is claimed is:

1. A video encoding apparatus, comprising:
    a parameter calculator configured to calculate a compensation parameter for a brightness compensation based on
        one or more first pixels adjacent to a current block, and
        one or more second pixels adjacent to a second block obtained by using a prediction motion vector of a motion vector of the current block,
        wherein locations of the one or more second pixels are determined based on locations one or more of the first pixels;
    a target pixel selector configured to select one or more target pixels in a prediction block of the current block for the brightness compensation by using pixels of a third block adjacent to the second block, the prediction block of the current block being determined by the motion vector of the current block; and
    a predictive encoder configured
        to perform the brightness compensation for the prediction block by applying the calculated compensation parameter to the selected target pixels to generate a compensated prediction block, and
        to perform a predictive encoding by using the compensated prediction block,
    wherein the target pixel selector is configured to select the target pixels based on a minimum threshold and a maximum threshold, the minimum threshold and the maximum threshold being calculated from values of the pixels of the third block adjacent to the second block.

2. The video encoding apparatus of claim 1,
wherein
    the compensation parameter includes at least one of a weighting factor or an offset,
    the weighting factor is calculated based on a ratio of pixel values between the one or more first pixels and the one or more second pixels, and
    the offset is calculated based on differences of the pixel values between the one or more first pixels and the one or more second pixels.

3. The video encoding apparatus of claim 1, wherein the predictive encoder is configured to encode a flag indicating whether the predictive encoding has been performed by applying the brightness compensation.

4. A video decoding apparatus, comprising:
    a parameter calculator configured to calculate a compensation parameter for a brightness compensation based on
        one or more first pixels adjacent to a current block, and
        one or more second pixels adjacent to a second block obtained by using a prediction motion vector of a motion vector of the current block,
        wherein locations of the one or more second pixels are determined based on locations of the one or more first pixels;
    a target pixel selector configured to select one or more target pixels in a prediction block of the current block for the brightness compensation by using pixels of third block adjacent to the second block, the prediction block of the current block being determined by the motion vector of the current block; and
    a predictive decoder configured
        to perform the brightness compensation for the prediction block by applying the calculated compensation parameter to the selected target pixels to generate a compensated prediction block, and
        to perform a predictive decoding by using the compensated prediction block,
    wherein the target pixels are selected based on a minimum threshold and a maximum threshold, the minimum threshold and the maximum threshold being calculated from values of the pixels of the third block adjacent to the second block.

5. The video decoding apparatus of claim 4,
wherein
    the one or more first pixels are determined based on a predetermined maximum threshold and a predetermined minimum threshold, and
    the predetermined maximum threshold and the predetermined minimum threshold are calculated from values of pixels of fourth block adjacent to the current block.

6. The video decoding apparatus of claim 4,
wherein
    the compensation parameter includes at least one of a weighting factor or an offset,
    the weighting factor is calculated based on a ratio of pixel values between the one or more first pixels and the one or more second pixels, and
    the offset is calculated based on differences of the pixel values between the one or more first pixels and the one or more second pixels.

7. The video decoding apparatus of claim 4, wherein the predictive decoder is configured to apply the compensation parameter to the selected one or more target pixels when a flag decoded from received encoded data indicates a predictive encoding by applying the brightness compensation.

8. The video decoding apparatus of claim 4, wherein the predictive decoder is configured to apply the compensation parameter to all pixels belonging to the prediction block when a value of a flag included in a slice header of decoded data indicates a full block brightness compensation, wherein the flag is decoded from received encoded data.

9. The video decoding apparatus of claim 8, wherein the predictive decoder is configured to apply the compensation parameter to all pixels of the prediction block when the value of the flag included in the slice header of the decoded data indicates to perform the full block brightness compensation with a prediction mode being a skip mode or a merge mode.

10. The video decoding apparatus of claim 4, wherein the predictive decoder is configured to apply the compensation parameter to all pixels of the prediction block when the compensation parameter deviates from a predetermined normative range.

11. A video encoding method, the method performed by a video encoding apparatus and comprising:
- calculating a compensation parameter for a brightness compensation based on one or more first pixels adjacent to a current block, and
  - one or more second pixels adjacent to a second block obtained by using a prediction motion vector of a motion vector of the current block,
  - wherein locations of the one or more-second pixels are determined based on locations of the one or more first pixels;
- selecting one or more target pixels in a prediction block of the current block for the brightness compensation by using pixels of third block adjacent to the second block, the prediction block of the current block being determined by the motion vector of the current block;
- performing the brightness compensation for the prediction block by applying the calculated compensation parameter to the selected target pixels to generate a compensated prediction block; and
- performing a predictive encoding by using the compensated prediction block,
- wherein the target pixels are determined based on a minimum threshold and a maximum threshold, the minimum threshold and the maximum threshold being calculated from values of the pixels of the third block adjacent to the second block.

12. The video encoding method of claim 11,
wherein
- the compensation parameter includes at least one of a weighting factor or an offset,
- the weighting factor is calculated based on a ratio of pixel values between the one or more first pixels and the one or more second pixels, and
- the offset is calculated based on differences of the pixel values between the one or more first pixels and the one or more second pixels.

13. The video encoding method of claim 11, further comprising:
- inserting a flag in a slice header of encoded data,
wherein
- a value of the flag indicates a performance or nonperformance of a full block brightness compensation, and
- the performing of the predictive encoding applies the compensation parameter to all pixels of the prediction block when the value of the flag indicates the performance.

14. The video encoding method of claim 11, wherein the performing of the predictive encoding applies the compensation parameter to all pixels of the prediction block when the compensation parameter deviates from a predetermined normative range.

15. A video decoding method, the method performed by a video encoding apparatus and comprising:
- calculating a compensation parameter for a brightness compensation based on one or more first pixels adjacent to a current block, and
  - one or more second pixels adjacent to a second block obtained by using a prediction motion vector of a motion vector of the current block,
  - wherein locations of the one or more second pixels are determined based on locations the one or more first pixels;
- selecting one or more target pixels in a prediction block of the current block for the brightness compensation by using pixels of third block adjacent to the motion prediction second block, the prediction block of the current block being determined by the motion vector of the current block; and
- performing the brightness compensation for the prediction block by applying the compensation parameter to the selected target pixels to generate a compensated prediction block; and
- performing a predictive decoding by using the compensated prediction block,
- wherein the target pixels are determined based on a minimum threshold and a maximum threshold, the minimum threshold and the maximum threshold being calculated from values of the pixels of the third block adjacent to the second block.

16. The video decoding method of claim 15, wherein the performing of the predictive decoding applies the compensation parameter to the selected target pixels when a flag decoded from received encoded data indicates a predictive encoding by applying the brightness compensation.

17. The video decoding method of claim 15, wherein the performing of the predictive decoding applies the compensation parameter to all pixels of the prediction block when a value of a flag included in a slice header of decoded data indicating a full block brightness compensation, wherein the flag is decoded from received encoded data.

18. The video decoding method of claim 15, wherein the performing of the predictive decoding applies the compensation parameter to all pixels of the prediction block when the compensation parameter deviates from a predetermined normative range.

* * * * *